March 4, 1941. L. L. CAMPBELL 2,233,732
BUILT-IN JACK FOR MOTOR VEHICLES
Filed May 2, 1939 5 Sheets-Sheet 1
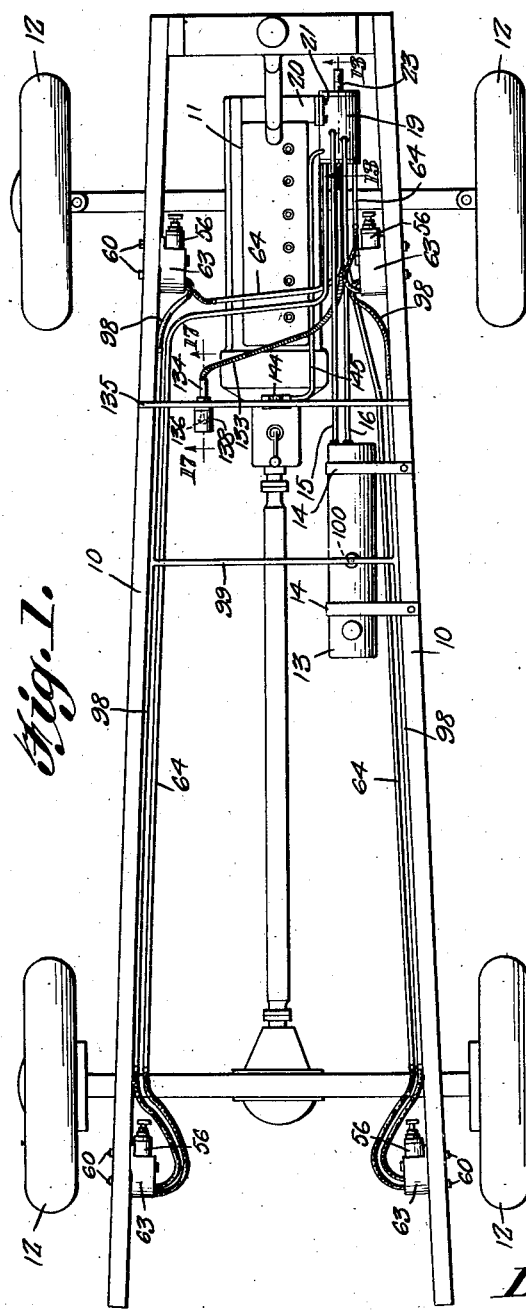
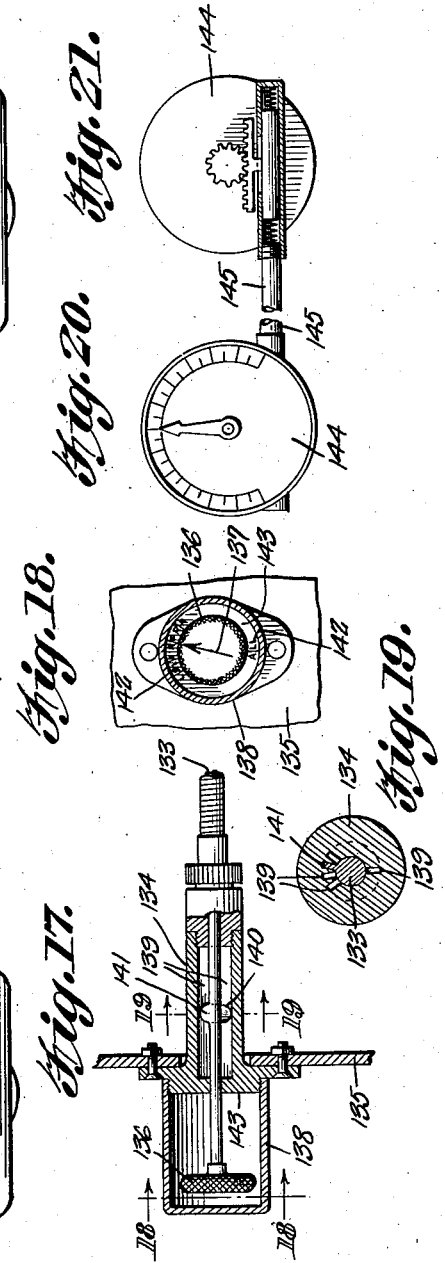
Lester L. Campbell,
INVENTOR
BY Victor J. Evans & Co.
ATTORNEYS
WITNESS

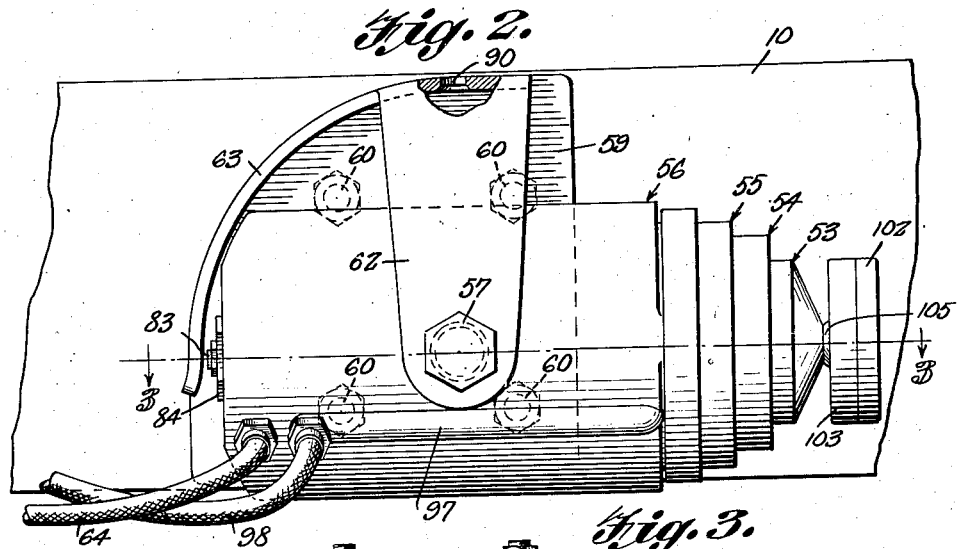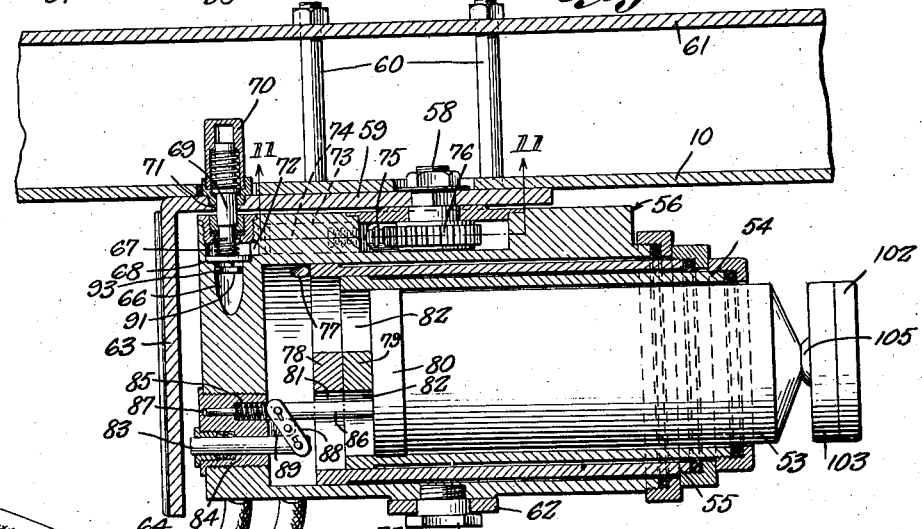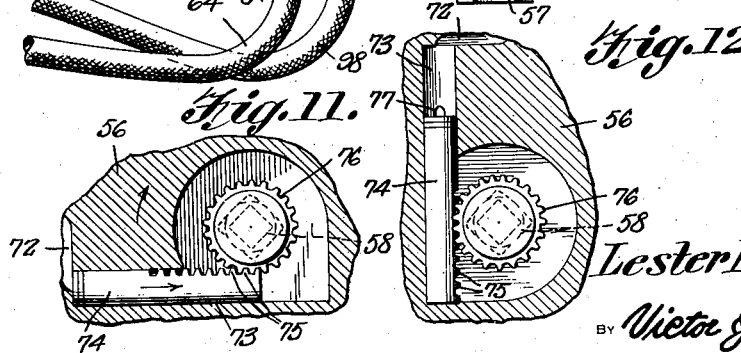

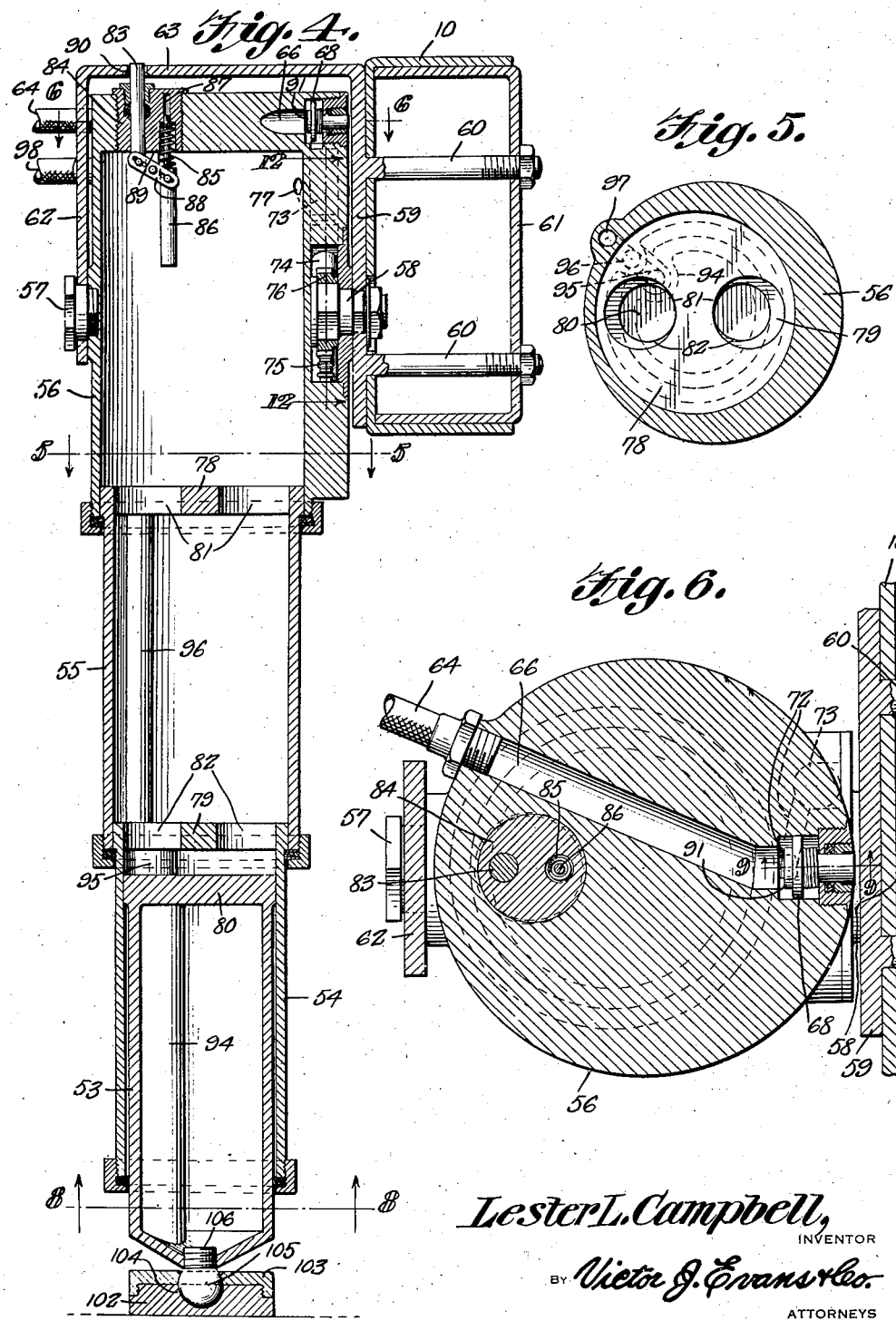

March 4, 1941.  L. L. CAMPBELL  2,233,732
BUILT-IN JACK FOR MOTOR VEHICLES
Filed May 2, 1939  5 Sheets-Sheet 4

Lester L. Campbell,
INVENTOR
BY Victor J. Evans & Co.
ATTORNEYS

WITNESS

March 4, 1941. L. L. CAMPBELL 2,233,732
BUILT-IN JACK FOR MOTOR VEHICLES
Filed May 2, 1939 5 Sheets-Sheet 5
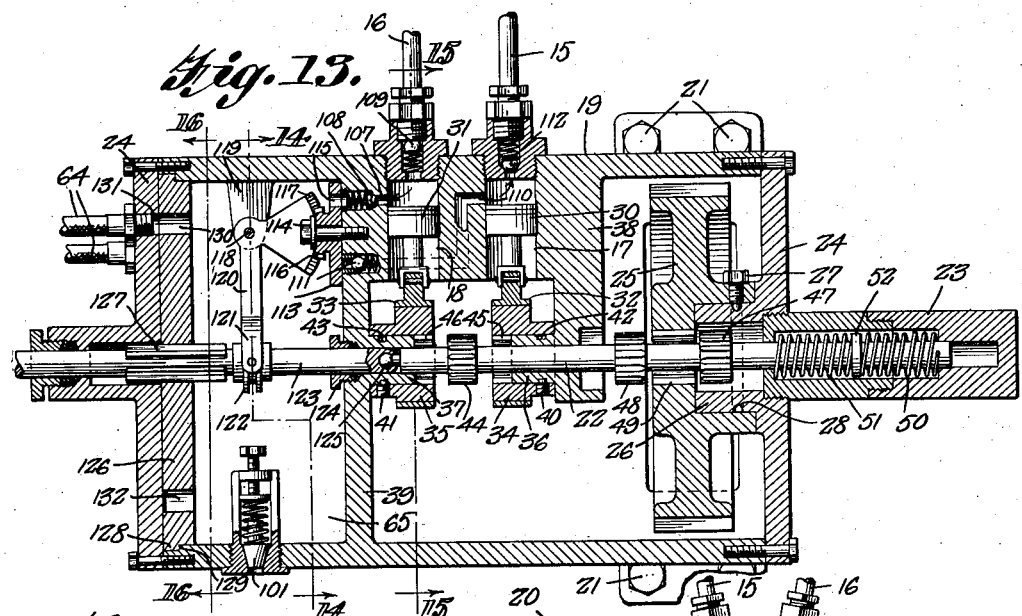
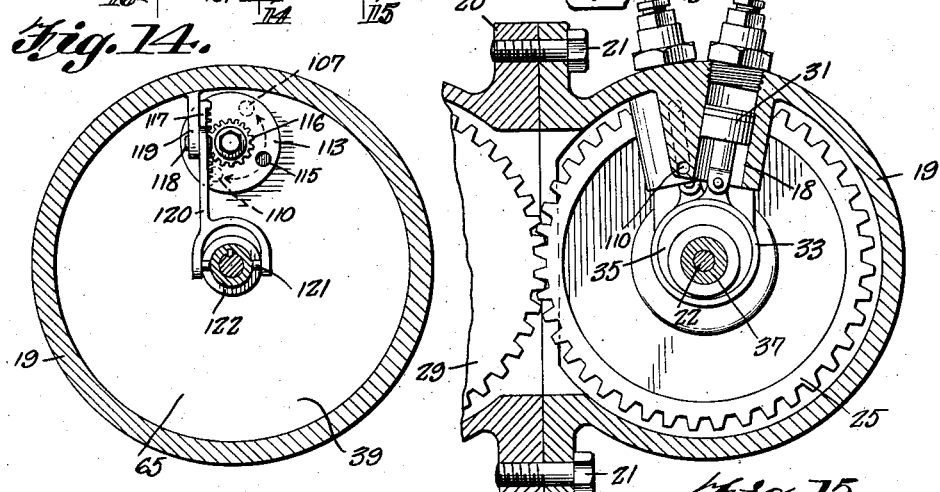
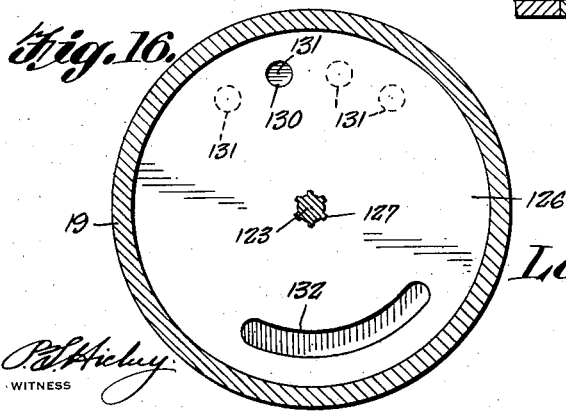
Lester L. Campbell, INVENTOR
BY Victor J. Evans & Co.
ATTORNEYS Patented Mar. 4, 1941

2,233,732

UNITED STATES PATENT OFFICE 2,233,732

BUILT-IN JACK FOR MOTOR VEHICLES

Lester L. Campbell, Boone, W. Va., assignor of one-half to Norman L. Cardey, Winona, W. Va.

Application May 2, 1939, Serial No. 271,375

2 Claims. (Cl. 254—86)

This invention relates to built-in jacks for motor vehicles and has for an object to provide jacks of simplified construction adapted to extend horizontally on the vehicle so as to be inconspicuous when not in use, and adapted to be easily and quickly swung to the vertical and extended to lift the chassis for facilitating inspection and repairs.

A further object is to provide jack mechanism of this type in which the telescopic sections of the jack are operated through a fluid pressure medium controlled by a pair of pumps selectively operated to force the medium in one direction to extend the jack and force the medium in the opposite direction to retract the jack.

A still further object is to provide jack mechanism of this character in which novel fluid pressure controlled means are employed to positively lock the jack in horizontal released position so that the same cannot become dislodged by vibration or severe conditions of service.

A further object is to provide jack mechanism of this character having simplified mechanism for positively locking the jack in vertical extended position so that tipping over of the jack will be positively prevented.

A further object is to provide jack mechanism having a swivelly mounted foot member adapted to conform to inequalities in the ground and permit the jack to always assume vertical position when in use.

A further object is to provide jack mechanism of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of a motor vehicle chassis showing jack mechanism constructed in accordance with the invention, applied thereto.

Figure 2 is a side elevation of one of the jacks in released horizontal position.

Figure 3 is a longitudinal sectional view taken on the line 3—3 of Figure 2.

Figure 4 is a vertical sectional view of one of the jacks in extended position to elevate the chassis of the vehicle.

Figure 5 is a detail cross sectional view taken on the line 5—5 of Figure 4 showing the ports in one of the telescopic sections of a jack.

Figure 6 is a detail cross sectional view taken on the line 6—6 of Figure 4, drawn to enlarged scale, and showing the fluid controlled lock means for holding the jack in operative and in released position.

Figure 11 is a detail longitudinal sectional view taken on the line 11—11 of Figure 3 and showing the mechanism for rotating the jack on its trunnions.

Figure 12 is a detail longitudinal sectional view taken on the line 12—12 of Figure 4 showing the jack swung through an angle of 90 degrees on its trunnions.

Figure 13 is a longitudinal sectional view, drawn to enlarged scale, taken on the line 13—13 of Figure 1 and showing the pump mechanism and controls therefor.

Figure 14 is a cross sectional view taken on the line 14—14 of Figure 13 and showing the mechanism for controlling the direction of flow of the fluid medium.

Figure 15 is a detail cross sectional view taken on the line 15—15 of Figure 13 showing the pumps geared to the timing gear of the vehicle to be driven thereby.

Figure 16 is a detail cross sectional view taken on the line 16—16 of Figure 13 showing the selector mechanism for controlling the various jacks.

Figure 17 is a detail longitudinal sectional view taken on the line 17—17 of Figure 1 showing the control button for selecting a predetermined pump and jack to be operated.

Figure 18 is a cross sectional view taken on the line 18—18 of Figure 17 showing the legends for indicating the setting of the control button.

Figure 19 is a cross sectional view taken on the line 19—19 of Figure 17 showing the selector grooves and lug on the push button stem coacting with these grooves.

Figure 20 is a front elevation of a pressure gauge.

Figure 21 is a rear elevation of the gauge shown in Figure 20 with parts in section.

Figure 7:
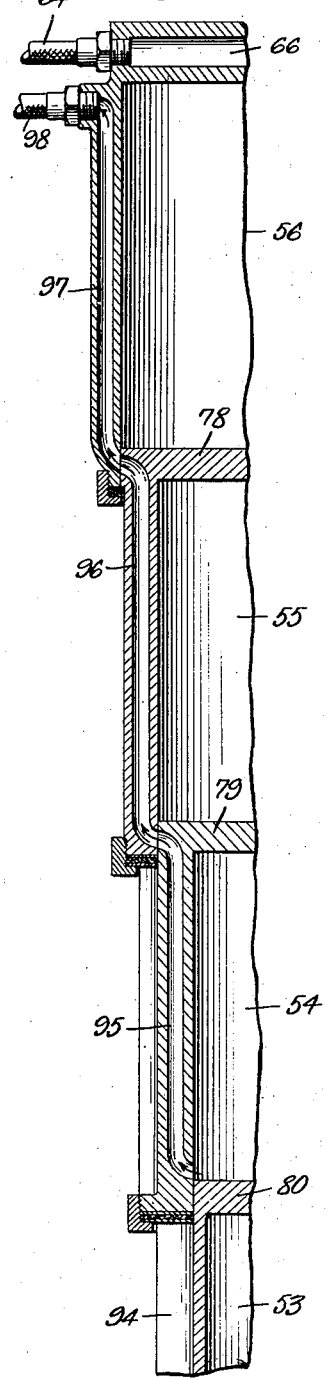
Figure 7 is a fragmentary longitudinal sectional view of the jack extended and showing the pressure release passages to take care of abnormal pressures when the jack is extended.

Referring now to the drawings in which like characters of reference designate similar parts in the various views, 10 designates the side rails of a motor vehicle chassis, 11 the motor, and 12 the wheels, these parts being conventional.

In carrying out the invention, a tank 13, for a fluid pressure medium, such as oil, is secured to the chassis through the medium of brackets 14. A pair of pipes 15 and 16 are connected at their rear ends to the tank and at their front ends are connected to respective cylinders 17 and 18 formed in a casing 19 which is bolted to the motor gear case 20, as shown at 21 in Figures 1, 13 and 15.

A shaft 22 is rotatably and slidably mounted in a bearing 23 carried by one of the heads 24 of the casing. A gear 25 is sleeved on the shaft and is rotatably mounted on a hub 26 carried by the casing head 24, through the medium of a screw 27 which is engaged through the gear and projects into a circular groove 28 formed in the hub concentric with the shaft. The gear meshes with the timing gear 29, as shown in Figure 15.

A pair of pistons 30 and 31 are mounted in the cylinders 17 and 18 and the piston rods thereof are equipped with respective eccentric straps 32 and 33 which surround eccentric gears 34 and 35. These eccentric gears are loose on respective hubs 36 and 37 carried by partitions 38 and 39 disposed in spaced relationship within the casing 19. Pins 40 and 41 fit in grooves 42 and 43 in the hubs to secure the eccentric gears.

The shaft 22 is provided between the eccentric gears with a gear 44 which is adapted to be selectively brought into mesh with the gear teeth 45 and 46 of the eccentric gears 34 and 35 when the shaft is moved endwise.

The purpose of this is to drive the pistons 30 and 31 selectively, one of the pistons sucking the oil from the supply tank 13 and forcing it into the hereinafter described jacks to extend the jacks, and the other being adapted to suck the oil out of the jacks and return it to the supply tank for retracting the jacks as will be hereinafter described in detail.

When the shaft 22 is moved endwise to mesh the pinion 44 with a selected one of the eccentric gears, the drive gear 25 must rotate in a corresponding direction. For this purpose the shaft is equipped with a pair of gears 47 and 48 which are selectively engageable with gear teeth 49 formed on the inner periphery of the gear 25. When the shaft is moved endwise to engage the pinion 44 with the eccentric 43 of the suction piston the gear 48 on the shaft engages with the gear teeth 49 of the driving gear 25. Conversely when the shaft is moved endwise in the opposite direction to engage the gear 44 with the gear teeth 46 to operate the pressure piston, the gear 47 is engaged with the gear teeth 49 of the driving gear 25.

For holding the shaft 22 in neutral position, a pair of helical springs 50 and 51 are sleeved upon the shaft in the bearing 23 on opposite sides of a collar 52. These springs exert pressure on the collar to hold the gears 47 and 44 in neutral position.

There are four fluid pressure jacks, attached to the axles or rails 10, near respective wheels 12. As best shown in Figures 2, 3 and 4, each jack comprises preferably four telescopically assembled sections 53, 54 and 55 and 56, the upper section having a pair of oppositely disposed pivotal supports or gudgeons 57 and 58. An attaching plate 59 receives the gudgeon 58 and is provided with four bolts 60, best shown in Figure 2, which are engaged through the chassis side rail 10 and through a channel beam 61 which is telescopically engaged in the rail, as best shown in Figure 4.

The gudgeon 57 is received in an arm 62 which extends parallel to the attaching plate 59 and is connected to an arcuate web 63, best shown in Figure 2, which is integral with the attaching plate. The jack swings from the horizontal released position shown in Figure 2 to the vertical operative position shown in Figure 4, on the pivots or gudgeons 57 and 58.

By now referring to Figure 1 it will be seen that the upper section 56 of each jack is connected by a respective pipe 64 to the casing 19. Through this pipe the fluid pressure medium may flow from a chamber 65 in the casing to the jack and may also return from the jack to this chamber for respectively extending and retracting the jack.

By referring to Figures 3, 4 and 6 it will be seen that the pipe 64 is connected to a duct 66 in the head of the upper section 56 of the jack. This duct communicates with a valve chamber 67 in which is seated a spring pressed valve 68. The stem of this valve bears against a latch 69 which is mounted in a housing 70 secured to the plate 59 of the chassis and is spring pressed toward the valve stem to pass through an opening 71 in the attaching plate 59 and lock the jack in horizontal released position. When pressure is let into the duct the initial work performed is that the valve 68 is urged outwardly to push the latch 69 back into its seat and free the jack to rotate on its gudgeons to operative position.

The next work performed by the pressure medium after unlatching the jack is to positively rotate the jack to its operative position and for this purpose a duct 72 is formed in the wall of the upper member 56 of the jack and communicates with a plunger chamber 73, best shown in Figures 11 and 12 in which a plunger 74 is mounted, having rack teeth 75 which engage a gear 76 fixed stationary to the gudgeon 58. The pressure medium moves the plunger in a path around the gear to positively rock the jack in the direction of the arrowheads shown in Figure 11, to move it to the vertical operative position shown in Figure 12.

The next work performed by the fluid medium after rocking the jack to vertical operative position is that of extending the jack. For this purpose a port 77, best shown in Figures 3 and 4 is formed in the wall of the upper section 56 of the jack and communicates with the plunger chamber 73 so that when this port is exposed by movement of the plunger to its limit of movement the fluid pressure medium will pass into the upper section 56 and against the heads 78, 79 and 80 of the sections to extend the sections. Ports 81 and 82 are formed in the heads of the intermediate sections 78 and 79 to permit the pressure equalizing throughout all of the sections to extend the jack. The head 80 is solid and no pressure medium enters the lower section 53, which section is merely a hollow piston. The ports 81 and 82 also permit the pressure medium to be pumped from the sections to telescope the sections.

Figure 9:
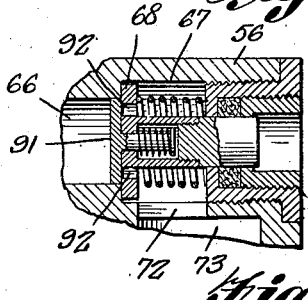
Figure 9 is a detail longitudinal sectional view taken on the line 9—9 of Figure 6 and showing the fluid operated means for releasing the lock mechanism which holds the jack in horizontal released position.
Figure 10:
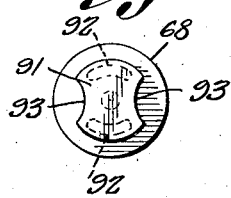
Figure 10 is an end elevation of the check valve of the piston shown in Figure 9.

The jack is locked in extended vertical position against collapse and for this purpose a latch pin 83, best shown in Figure 4, is slidably mounted in a pressure tight bearing 84 disposed in the head of the uppermost jack section 56. The pin is constantly forced outwardly through the medium of a helical spring 85 carried by a pin 86 which is mounted in a guide opening 87 formed in the head parallel with the latch pin. A link 88 is pivotally connected intermediate its ends to a lug 89 which projects from the head of the section 56, and is pivotally connected at its ends to the latch pin 83 and pin 86. When the jack is rotated from the horizontal to the vertical the spring urges the latch pin 83 into an opening 90 in the web 63 of the attaching plate 59 as the jack reaches the vertical to lock the jack against dislodgement. During telescoping movement of the sections of the jack, and just prior to the jack being rocked to the horizontal, the head 80 of the lowermost section 53 of the jack impinges against the pin 86 and rocks the link 88 to withdraw the latch pin 83 from the opening 90 so that the suction pump can create a vacuum back of the plunger 74, shown in Figure 12, and rock the jack to the horizontal released position. To permit a vacuum being exerted against the plunger, a small check valve 91, best shown in Figures 3, 9 and 10, is carried by the check valve 68 and opens oppositely thereto, that is, it opens by suction to expose ports 92 in the check valve 68 through which the jack may be evacuated of pressure. The sides of the check valve 91 are cut away as shown at 93 in Figure 10 to permit the fluid pressure passing the check valve 91.

When the jack arrives in horizontal position the latch pin 69 is urged by its spring through the opening 71 in the attaching plate 59 to lock the jack in released position.

Figure 8:
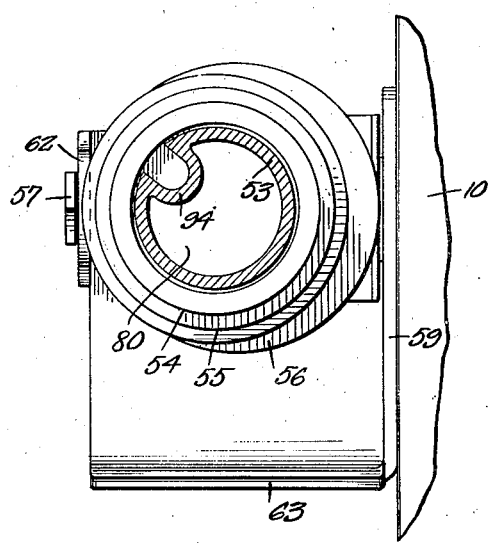
Figure 8 is a detail cross sectional view taken on the line 8—8 of Figure 4 and showing one of the U-shaped ducts for receiving the excess pressure pipe of the adjacent section of the jack.

For venting excess pressure from the jack to prevent breakage of the parts, the sections 54, 55 and 58 of the jack are provided with respective ducts 95, 96 and 97, best shown in Figures 2, 4 and 7. The ducts are formed integral to the walls of the sections and are U-shaped in cross section, as shown best in Figure 5 to be compactly nested to economize space. The section 53 is provided with a guide 94 of U-shape in cross section for the reception of the duct 95 when the jack is retracted, as shown in Figures 5 and 8.

The duct 97 of the uppermost section 56, of each jack, is connected to a respective pressure release pipe 98, as best shown in Figure 1, and the release pipes of the two jacks on the same side of the chassis communicate with a transversely disposed pipe 99 which is connected to the tank 13 through the medium of a short pipe 100. Thus excess pressure is returned to the storage tank.

For preventing excess suction breaking the parts, as best shown in Figure 13, an inwardly opening check valve 101 is mounted in the pressure chamber 65 of the casing 19 to admit atmospheric pressure to the chamber, it being understood that the storage tank 13 will be equipped with suitable safety valves to regulate the degree of pressure therein.

For adapting the jack to conform to inequalities in the ground and permit the jack to always assume vertical position when in use, a foot 102, in the nature of a disc of rubber or other non-slipping material is provided with a metal top plate 103 and the disc and plate are provided with a seat 104 to receive a ball 105 carried by a pin 106 which is threaded into the bottom section 53 of the jack, as best shown in Figure 4. The foot may tilt on the ball to conform to inequalities in the ground while the jack remains vertical.

By referring now to Figure 13 it will be seen that the pressure cylinder 18, beyond the piston, communicates with the chamber 65 in the casing 19 through the medium of a passage 107. The passage is controlled by a spring pressed ball check valve 108 which opens outward, that is, away from the axis of the cylinder. The pressure medium pipe 16 which communicates with this cylinder is provided with a ball check valve 109 which opens toward the piston. Thus during one stroke of the piston the fluid pressure medium will be drawn into the cylinder and during the opposite stroke of the piston will be ejected from the piston through the passage 107.

The suction cylinder 17 is provided with a passage 110 which communicates with the chamber 65 in the casing 19 and is controlled by a ball check valve 111 which opens toward the axis of the cylinder. The fluid pressure medium pipe 15 of this cylinder is provided with a ball check valve 112 which opens outwardly from the piston 30. Thus during one stroke of the piston fluid pressure medium will be drawn from the chamber 65 through the passage 110 and expelled through the pipe 15 into the storage tank 13.

In order that the pressure pump and the suction pump will be active alternately to respectively extend and retract a selected jack, or all of the jacks, a disc valve 113, best shown in Figures 13 and 14, is rotatably mounted on a stem 114, which is threaded into the partition 39. The valve is provided with one port 115, adapted to be brought selectively into registration with either the pressure passage 107 or the suction passage 110. The valve is provided with an integral pinion 116 which meshes with a segmental shaped rack 117. The rack is pivoted as shown at 118 upon a bracket 119 which extends from the wall of the cylinder and a forked shipper lever 120 is formed integral with the rack at the pivot thereof for moving the rack to selectively bring the port 115 into registration with either the pressure passage 107, or the suction passage 110, according to which direction the segment rack is moved past neutral.

For actuating the segment rack the forked shipper is provided with lugs 121, best shown in Figure 14, which engage in the groove of a grooved collar 122 which is fixed to a shaft 123. The shaft extends in alignment with the drive shaft 22 and is slidably mounted in a bearing 124 carried by the partition 39. The shaft is provided in the end with a socket which receives a ball 125 formed on the end of the drive shaft 22. Thus the drive shaft can idle without interfering with the shaft 123. By pulling the shaft 123 outwardly the shipper lever 120 is moved to dispose the port 115 of the valve 113 in registration with the pressure passage 107 so that the fluid pressure medium may be pumped into a selected jack or all of the jacks. At the same time the driving gear 44 is meshed with the eccentric gear 46 of the pressure piston to actuate the pressure piston.

Conversely, by pushing the shaft 123 inwardly the gear 44 is meshed with the eccentric gear 45 of the suction piston while at the same time the shipper lever 20 turns the valve 113 to bring the port 115 into registration with the suction passage 110 so that the fluid pressure medium is withdrawn from the jack to move the jack to released position.

When the shaft 22 is in a neutral position of its limit of movement in either direction, the driving gear 44 will be in neutral position and held thereby by the springs 50 and 51 so that neither piston will be active and the valve will be in the position shown in Figure 14, with the port 115 out of registration with the suction and pressure passages.

For selecting the jack to be operated, a selector disc valve 126, best shown in Figures 13 and 16, is splined on the shaft 123 as shown at 127 so that the shaft may move endwise therethrough while the valve is held against endwise movement through the medium of a flange 128 which is confined between the rear head 24 of the casing 19 and a shoulder 129 formed on the end of the casing wall. The valve is provided with a single port 130 adapted to be brought into registration selectively with ports 131 which are formed in an arcuate series in the rear head 24 of the casing and communicate with respective fuel medium pipes 64 of the four jacks. The valve 126 may be manually set to bring the port 130 into registration with the port 131 corresponding to the right rear jack, or to the right front jack, or to the left front jack, or to the left rear jack, as indicated by legends on Figure 18.

To connect all of the jacks with the fluid medium chamber 65 in the casing an arcuate slot 132 is formed in the valve 126 diametrically opposite the port 130 and concentric with the axis of the valve. The valve may be turned to bring this slot into registration with all of the ports 131 in which position of the valve all of the jacks may be lowered to the vertical to raise the entire vehicle, or may be swung to the horizontal to lower the vehicle to the ground.

For actuating the selector disc valve 126 a flexible shaft 133 is connected to the shaft 123 and extends through a tube 134 which is suitably secured in any preferred manner to the vehicle instrument board 135. The shaft terminates in a knob 136 which displays a pointer 137, best shown in Figure 18. A removable safety cap 138 houses the knob.

The tube 134 is provided with longitudinal radially disposed slots 139, best shown in Figures 17 and 19. The centermost portions of these slots communicate with an annular recess or groove 140 in which is lodged a lug 141 carried by the shaft 133. When it is desired to operate the jack the knob 136 may be turned until the lug registers with a selected slot 139, designated by corresponding legends 142 formed on a dial 143 concentric with the shaft 133, and with which the pointer 137 cooperates. This rotation of the shaft 133 sets the selector valve 126 to establish communication between the chamber 65 in the casing 19 and a selected port 130, corresponding to the jack to be operated. Thereupon the knob 136 is pushed inwardly to pump fluid medium into the selected jack and may be pulled outwardly to withdraw the fluid medium from the jack. The knob is always finally manipulated to lodge the lug 141 in the groove 140 and this movement actuates the shaft 133 to return the selector valve 126 to neutral position.

A suitable pressure gauge 144 is mounted on the instrument board 135 and is connected to the pressure chamber 65 of the casing 19 through the medium of a pipe 145.

Since the operation of the device has been described as the description of the parts progressed it is thought that the invention will be fully understood without further explanation.

What is claimed is:

1. The combination with a motor vehicle chassis, of jacks formed of telescopically assembled sections, a support for each jack carried by the chassis, gudgeons extending from the upper section of each jack journaled in said support to permit the jack to be swung to horizontal inoperative position against the chassis and to be swung to vertical operative position below the chassis, a fluid pressure passage in the upper section of each jack, a latch means carried by the chassis and engageable with the upper section of a respective jack to hold the jack in horizontal inoperative position, valve operated means in said passage for moving said latch means to released position, valve operated means in said passage connected to one of said gudgeons to positively rotate the jack to vertical operative position after release of the latch means, there being ports in the sections permitting the fluid pressure medium to equalize throughout the sections to hold the jack in extended position after actuation of the jack rotating means, and bypasses in the sections permitting release of excess fluid pressure, withdrawal of the fluid pressure medium from the sections reversing the operation of said jack rotating means to return the jack from the vertical to the horizontal released position.

2. The combination with a motor vehicle chassis, of jacks formed of telescopically assembled sections, a support for each jack carried by the chassis, gudgeons extending from the upper section of each jack journaled in said support to permit the jack to be swung to horizontal inoperative position against the chassis and to be swung to vertical operative position so as to extend below the chassis, a fluid pressure passage in the upper section of each jack, a latch means carried by the chassis and engageable with the upper section of a respective jack to hold the jack in horizontal inoperative position, valve operated means in said passage for moving said latch means to released position, a plunger in said passage having rack teeth, a gear fixed to one of said gudgeons meshing with said rack teeth, the fluid pressure medium operating against said plunger subsequent to disengagement of the jack from the chassis to move the plunger and rotate the jack in a path concentric with the gudgeons to vertical operative position, there being ports in the sections permitting fluid pressure medium to equalize throughout the sections to hold the jack in extended position after actuation of the jack rotating means, and spring pressed latching means carried by the upper section of each jack engageable with the support when the jack reaches vertical position to positively hold the jack against dislodgement from vertical position.

LESTER L. CAMPBELL.